United States Patent [19]
Goryl

[11] Patent Number: 5,967,390
[45] Date of Patent: Oct. 19, 1999

[54] INFLATABLE CONTAINERS

[76] Inventor: Andrew Frank Goryl, 5 Manor Terrace, Manor Road, Seaton, Devon EX12 2AH, United Kingdom

[21] Appl. No.: 08/822,807

[22] Filed: Mar. 24, 1997

[51] Int. Cl.$^6$ ............................................. A45F 5/00
[52] U.S. Cl. ..................... 224/153; 224/612; 224/617; 224/627; 383/3
[58] Field of Search ......................... 224/153, 578, 224/579, 580, 614, 616, 617, 610, 611, 612, 627, 600, 628, 629; 383/3, 6, 104; 190/18 A

[56] References Cited

U.S. PATENT DOCUMENTS

| | | | |
|---|---|---|---|
| D. 280,465 | 9/1985 | Baum | 224/580 X |
| 3,995,802 | 12/1976 | Johnston | 224/629 X |
| 4,044,867 | 8/1977 | Fisher | 383/3 X |
| 4,091,852 | 5/1978 | Jordan et al. | 383/3 |
| 4,099,656 | 7/1978 | Neumann et al. | 383/3 X |
| 4,790,463 | 12/1988 | Hansen | 383/3 X |
| 5,762,198 | 6/1998 | Hung | 383/3 X |
| 5,769,232 | 6/1998 | Cash et al. | 383/3 X |

FOREIGN PATENT DOCUMENTS 2441358  7/1980  France ................................. 190/18 A

*Primary Examiner*—Gregory M. Vidovich
*Attorney, Agent, or Firm*—Melvin I. Stoltz

[57] ABSTRACT

An inflatable container, for use by a fisherman, comprises a bag formed of a resilient water-proof material. The bag includes an inflatable base and inflatable walls. The bag can be used for transporting goods either when inflated or when deflated. The bag has at least one carrying strap or handle and, when inflated and being used as a bait bag, can be fastened to the waist of the fisherman so as to act as a buoyancy aid.

2 Claims, 5 Drawing Sheets

INFLATABLE CONTAINERS

FIELD OF THE INVENTION

This invention relates to inflatable containers formed of resilient sheet material and is particularly concerned with inflatable containers for use by fishermen and divers.

One form of inflatable container for use by fishermen is described in U.S. Pat. No. 4,091,852 and comprises a plurality of inflatable panels integrally joined along fold lines to provide a bottom wall, side walls and a top wall which also functions as an openable cover, which may be held in its closed position by means of a releasable fastener.

The container of U.S. Pat. No. 4,091,852 is intended to be used as an ice chest within which a fisherman can take home his catch of fish. It is not, however, suitable for use as a general purpose container, for example, as a bait bag, and, because of the fold lines which interconnect the inflatable panels, ruptures fairly easily if not handled with care.

U.S. Pat. No. 4,269,142 shows an aquarium formed from interconnected plastic sheets. U.S. Pat. No. 4,384,603 shows an inflatable container formed from water-impermeable material. U.S. Pat. No. 3,631,544 shows an inflatable paddling pool. U.S. Pat. No. 4,858,755 relates to an inflatable display container. These containers and like devices are not, however, suitable for use as bait bags or for similar purposes.

U.S. Pat. No. 4,905,404 shows a floating fish basket. U.S. Pat. No. 4,450,647 shows a water-proof container for use as a bait holder for leeches, and U.S. Pat. No. 4,177,601 shows a floated bag trap for crabs and the like, and U.S. Pat. No. 4,890,413 relates to a floating fish container. These containers and like devices are, however, again not suitable for use as bait bags or for similar purposes.

It is accordingly an object of the present invention to provide an improved form of bait container.

A more specific object of the present invention is the provision of an improved form of bait bag for use by fishermen.

A further object of the present invention is the provision of an improved form of container for use by divers.

SUMMARY OF THE INVENTION

One aspect of the present invention comprises an inflatable container in the form of a bag formed of a resilient water-proof material, said bag including an inflatable base and inflatable side walls extending upwardly from the base such that the bag can be used for transporting goods both when inflated and when deflated, and at least one carrying element attached to the bag, the bag preferably being provided with a cover in the form of a resilient sheet having zip fastener means such that, when it is desired to close the bag, the cover can be zipped up around the tops of the side walls of the bag.

The base of the bag is preferably of generally rectangular form having two shorter sides and two longer sides. The base is preferably provided with extension flaps extending from the two shorter sides of the base and these flaps preferably include eyelets. The carrying element may be in the form of a cord, strap or belt which is provided at its ends with clip formations for engagement with the eyelets. If a cord is used, this can enable the bag to be fastened to the waist of a fisherman. If a strap is used, this may be in the form of an adjustable shoulder strap to facilitate carrying of the bag.

The bag may be intended to be used as a bait bag and, when inflated and attached to the waist of a fisherman, will serve as a buoyancy aid.

Thus, according to a second aspect of the present invention, there is provided a bait bag in the form of an inflatable container comprising a base and side walls, the bait bag being provided with means whereby it can be fastened, alternatively, to the waist and around the neck of a fisherman so that, when inflated, it also acts as a buoyancy aid, the base and side walls of the bait bag being formed from two sheets of waterproof plastics material welded together in such manner as to define a plurality of inflatable pockets between the two sheets.

In addition to its use as a bait bag, the container can also be used for carrying fishing tackle and nets while in the water or on dry land. When inflated, it can be used while in the water to support fishing rods and landing nets. It can also be used either when deflated or when inflated for carrying diving equipment and tools, wet suits and flippers. When inflated it can be used to carry bottles of compressed air so that, when in the back of a van or the like, they are prevented from rolling around.

Other possible uses of the container of the present invention are as follows:

a) to carry fish-finding equipment, G.P.S., flares, VHF radio transmitters and receivers, first aid equipment, clothes and food which must be kept dry, b) to carry delicate or fragile items, for example, china and glass articles, and cushion them while in transit, c) to carry specialist equipment, for example, pot-holing equipment, which needs to be kept cushioned and dry, d) to act as a "marker" buoy when used by divers, e) to carry items, such as cameras and explosives, which need to be kept safe and dry, f) as in inflatable cushion or seat, or to support broken limbs in emergency situations, and g) to carry items being salvaged at sea, the container being used underwater when deflated and then inflated to carry the salvaged items to the surface.

According to a third aspect of the present invention there is provided a container for use by divers, in the form of an inflatable bag comprising a base, side walls extending upwardly from the base and a lid, at least the base and side walls being inflatable, and the lid being provided with water-tight closure means, such as a water-tight zip fastener, and the container being made of a flexible, water-proof material of appropriate strength, such as PVC/canvass, nylon, rubber and other man-made and natural fabrics. The seams of the container may be stitched and/or welded and/or glued.

The container can be of any suitable size, shape and color. For example, a bait bag may be 300×500 mm. in plan, whereas a container for use by divers would be almost twice as large.

As mentioned above, the container is preferably provided with a lid, but need not have a lid. If a lid is provided, it may be secured to the side walls of the container in any suitable manner, for example, by zip fasteners, by releasable fasteners of the kind sold under the Registered Trade Mark "VELCRO", by press studs, eyelets and laces or clips. If zip fasteners are used, they must be made water-tight so that, when the lid is zipped up, the contents of the container cannot escape and water cannot enter the container.

The base and side walls of the container (and the lid if provided) may be arranged for inflation by a number of inflation valves or by means of a single inflation valve. The base and side walls of the container may be provided with interconnecting airways so that one or more sections of the container can be inflated at one time. For example, the base and each side wall of the container, when inflated, may include three or four parallel ribs so as to provide a stable supporting surface for any articles placed within the container. The inflated sections can, however, be of any convenient number, size and shape.

Eyelets for connection of carrying straps, belts or handles may be fitted at any point to suit individual requirements and may, as mentioned above, be located in extension flaps extending from the ends of the base of the container. The eyelets can be made of any suitable corrosion-resistant material, such as brass or plastic, and can again be of any convenient size and shape.

Straps may be attached to the bag or container in a variety of ways to suit individual requirements. For example, the container may be used as a "shoulder bag", as a "hold-all" or as a "ruck-sack", depending on how the straps are attached. The straps can be made from any suitable material and colour, of any suitable width or length and may be adjustable in length.

The straps may be detachable from the container or permanently fixed to the container, using appropriate clips or other fastenings. The straps may be such that the container can be supported around the waist or neck of the user, either when inflated or when deflated.

The lid may be fitted to either end or side of the container to suit individual requirements. The container may be provided with pockets, fitments and/or internal dividers depending on the user's requirements. The divider(s) may or may not be inflated and may be used as a collar to keep the mouth of a fishing net afloat.

Inflation of the base and side walls may be effected by mouth, by means of a pump or by means of a bottle of carbon dioxide or other non-inflammable gas.

DESCRIPTION OF THE PREFERRED EMBODIMENTS

Figure 1:
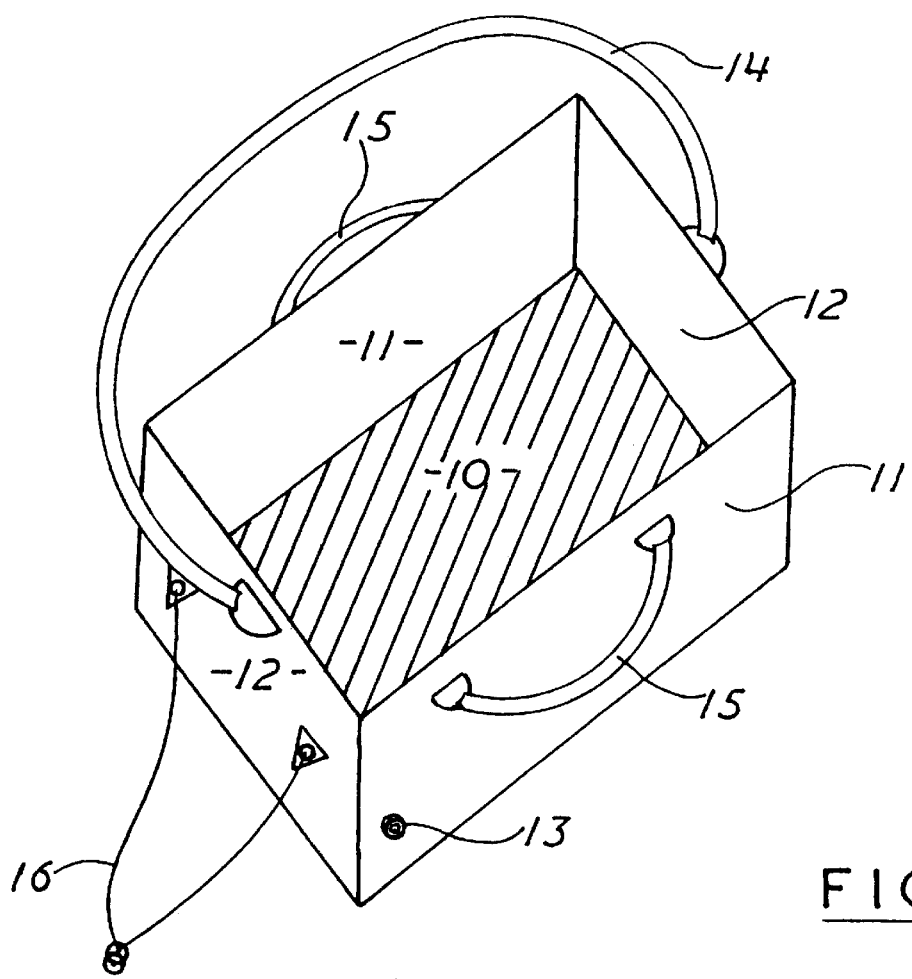
FIG. 1 is a diagrammatic isometric view of a floating bait holder.
Figure 2:
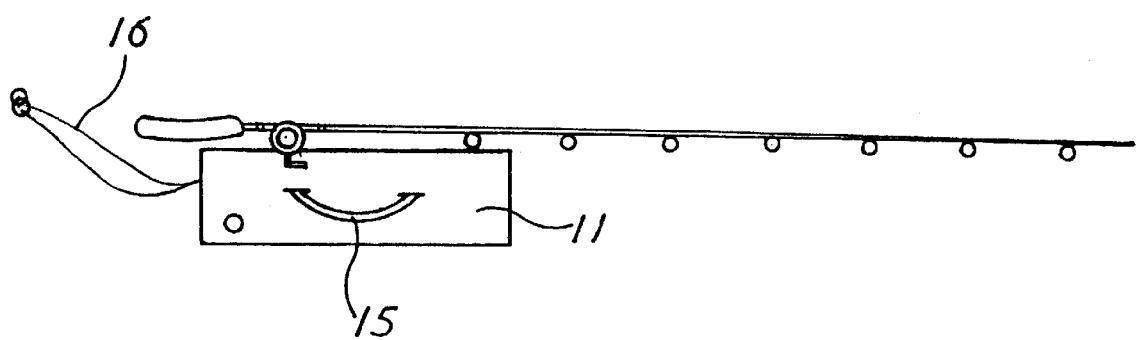
FIG. 2 shows the bait holder of FIG. 1 being used, when floating in the water, to support a fishing rod.

The bait holder shown in FIGS. 1 and 2 is in the form of a container which is of rectangular form in plan view, having a rectangular base 10, side walls 11 and end walls 12. The base 10, side walls 11 and end walls 12 are formed of a double-thickness, flexible, waterproof material and contain inflatable internal ribs or pockets which are interconnected together in such way that inflation of the base 10, side walls 11 and end walls 12 can be effected by blowing into a single inflation valve 13.

The two ends of a shoulder strap 14 are attached to flaps on the end walls 12 and hand straps 15 are attached to the two side walls 11. The container can thus be carried by the fisherman either on his shoulder (as a shoulder bag) or in his hands (like a hold-all or shopping bag).

A cord 16 is attached to one of the end walls 12 and includes a loop or eyelet or the like so that it can be fastened to, for example, a clip worn on the belt of the fisherman. When the fisherman is in the water, the bait holder will float alongside him so that his bait, spare tackle and the like are always readily at hand. The bait holder can also be used, as shown in FIG. 2, as a support for his fishing rod so that, when he needs two hands for whatever he may need to do, he can put the fishing rod down, ready to hand. It is to be appreciated that a landing net can be laid in a similar way on top of the bait holder.

Figure 3:
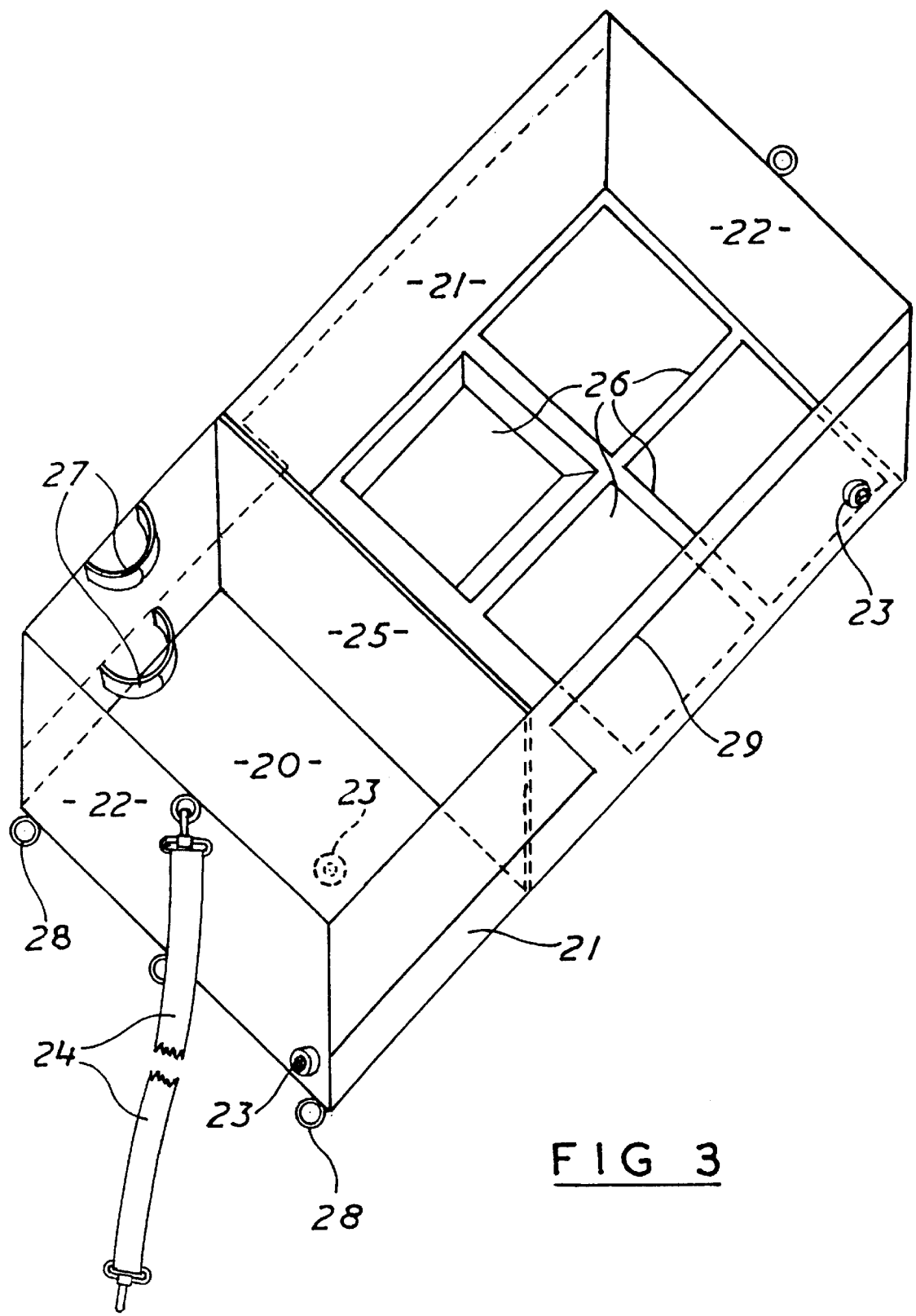
FIG. 3 is a diagrammatic isometric view of a first form of floating bait bag.

The bait bag shown in FIG. 3 is of similar design, comprising an inflatable rectangular base 20, inflatable side walls 21 and inflatable end walls 22, all formed of a flexible waterproof fabric such as heavy duty p.v.c. The bag of FIG. 3 has a number of inflation points 23 and is provided with a carrying/fixing strap 24 which is of adjustable length so that it can be used as a shoulder strap when attached to eyelets located at the midpoints of the upper edges of the end walls 22. The strap 24 can also be attached at its one end to a clip on the belt of the fisherman so that, in use, the bait bag can float alongside the fisherman.

The bag contains an internal partition 25 so as to divide the interior of the bag into two compartments, in one of which a number of bait boxes 26 are disposed and in the other of which other necessary items, e.g. food can be placed. One side of this other compartment can also be provided with short straps 27 for supporting and holding a vacuum flask in position. The internal partition 25 may itself be inflatable and, if more than one internal partition is provided, all the internal partitions may be inflatable. Eyelets 28 can be provided adjacent the corners of the base 20 of the bag to receive bank sticks (not shown) to permit location of the bag, if so desired, at a particular position along the bank of a river.

The bag shown in FIG. 3 will be inflated in use but, when deflated, can be folded in half and then the two halves fastened together by means of a zip fastener mechanism 29 carried by one of the side walls 21.

Figure 4:
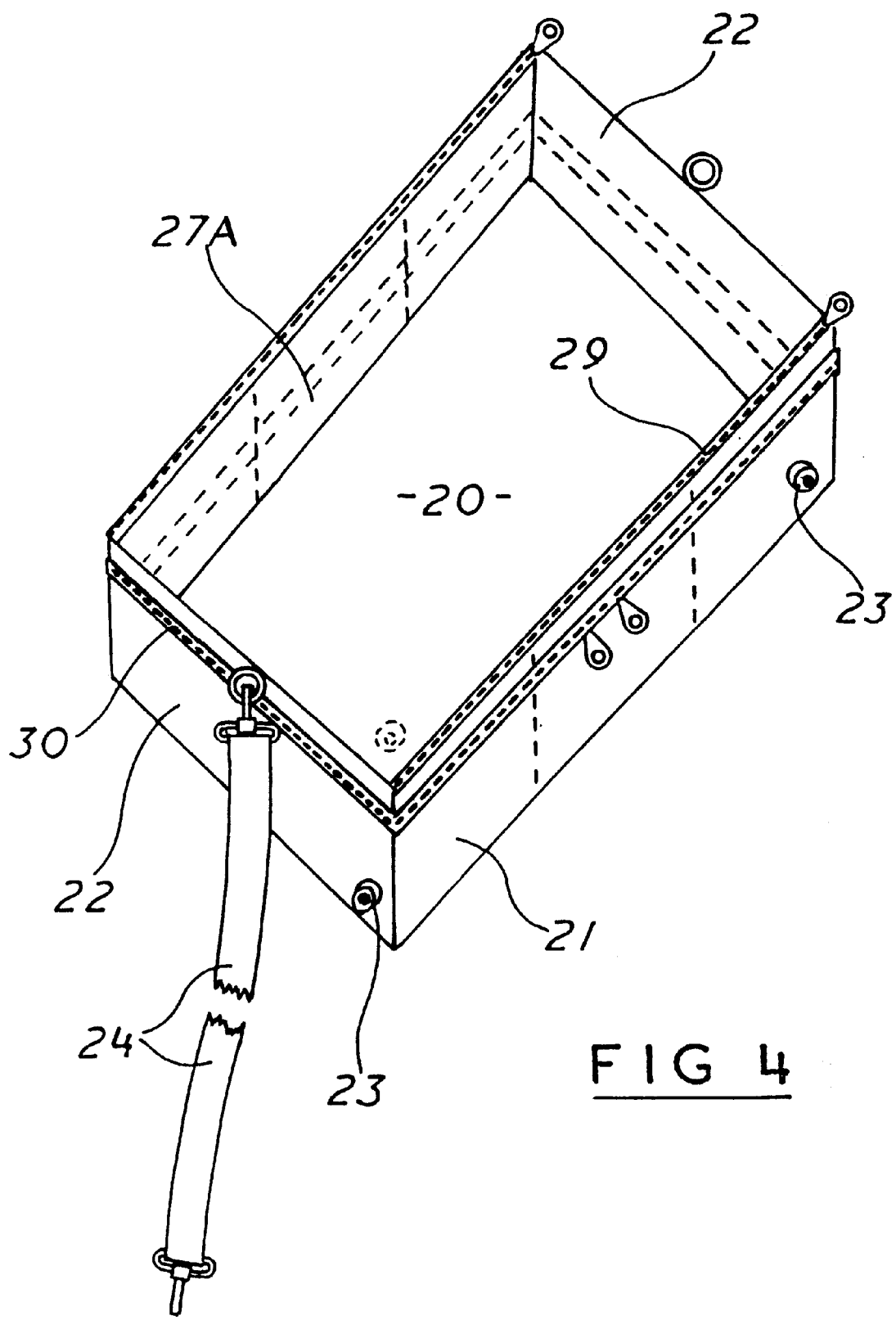
FIG. 4 is a diagrammatic isometric view of a second form of floating bait bag.

Turning next to FIG. 4, this shows a bait bag similar to that of FIG. 3, so that the same reference numerals are used to indicate parts of the bag of FIG. 4 which are the same as corresponding parts of the bag of FIG. 3.

The bag of FIG. 4 differs from that of FIG. 3 in that, instead of having an internal partition, it has internal pockets 27A which can be closed by means of a first zip fastener mechanism 29. When deflated, the bag can be folded in half and then closed by means of a second zip fastener mechanism 30 which extends from the centre of the top of one of the end walls 22 along the tops of both side walls 21 of the bag. The bag is again provided with a carrier strap 24 and can be used as described above.

Figure 5:
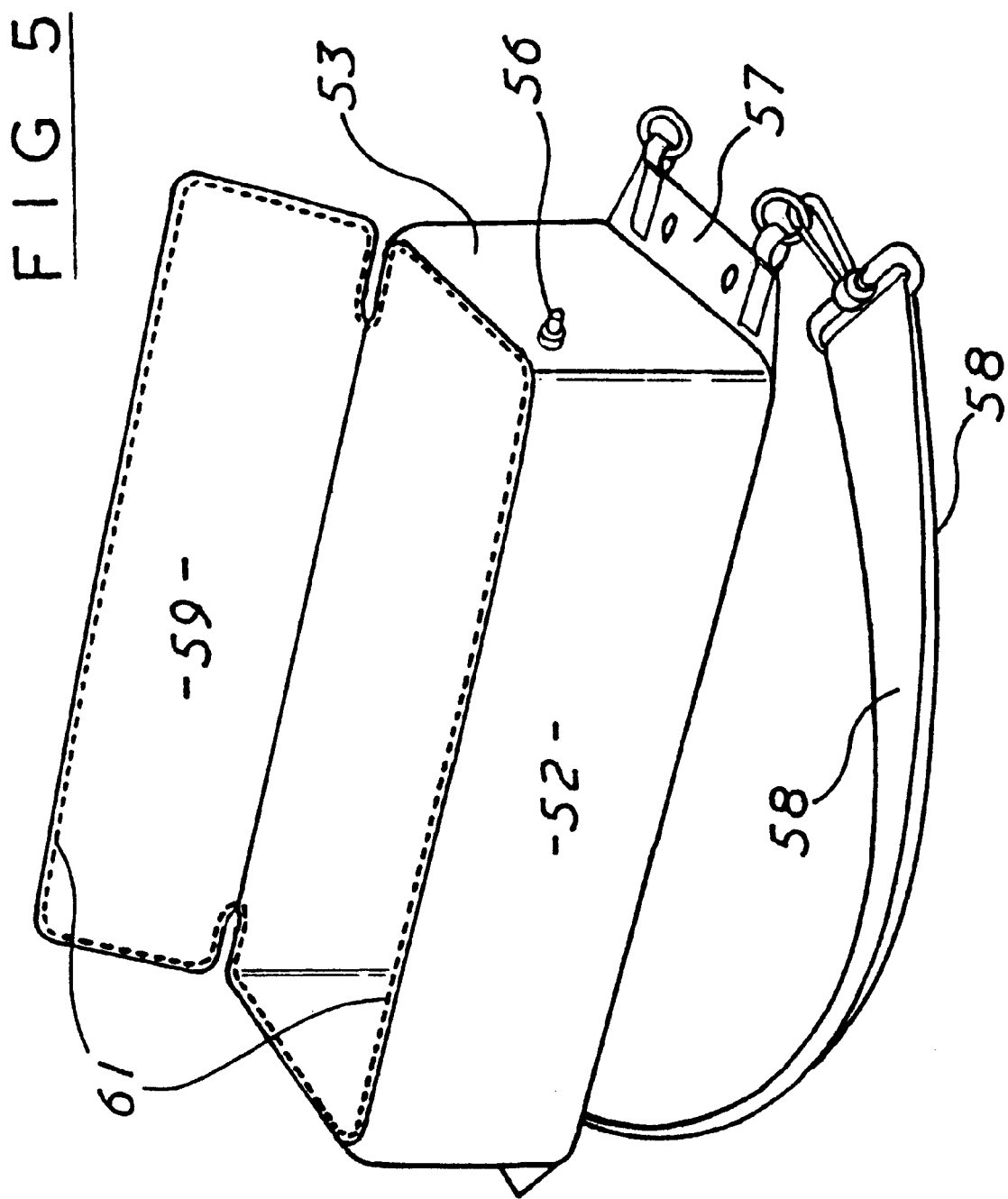
FIG. 5 is a perspective view of a third form of floating bait bag having a closable lid.
Figure 6:
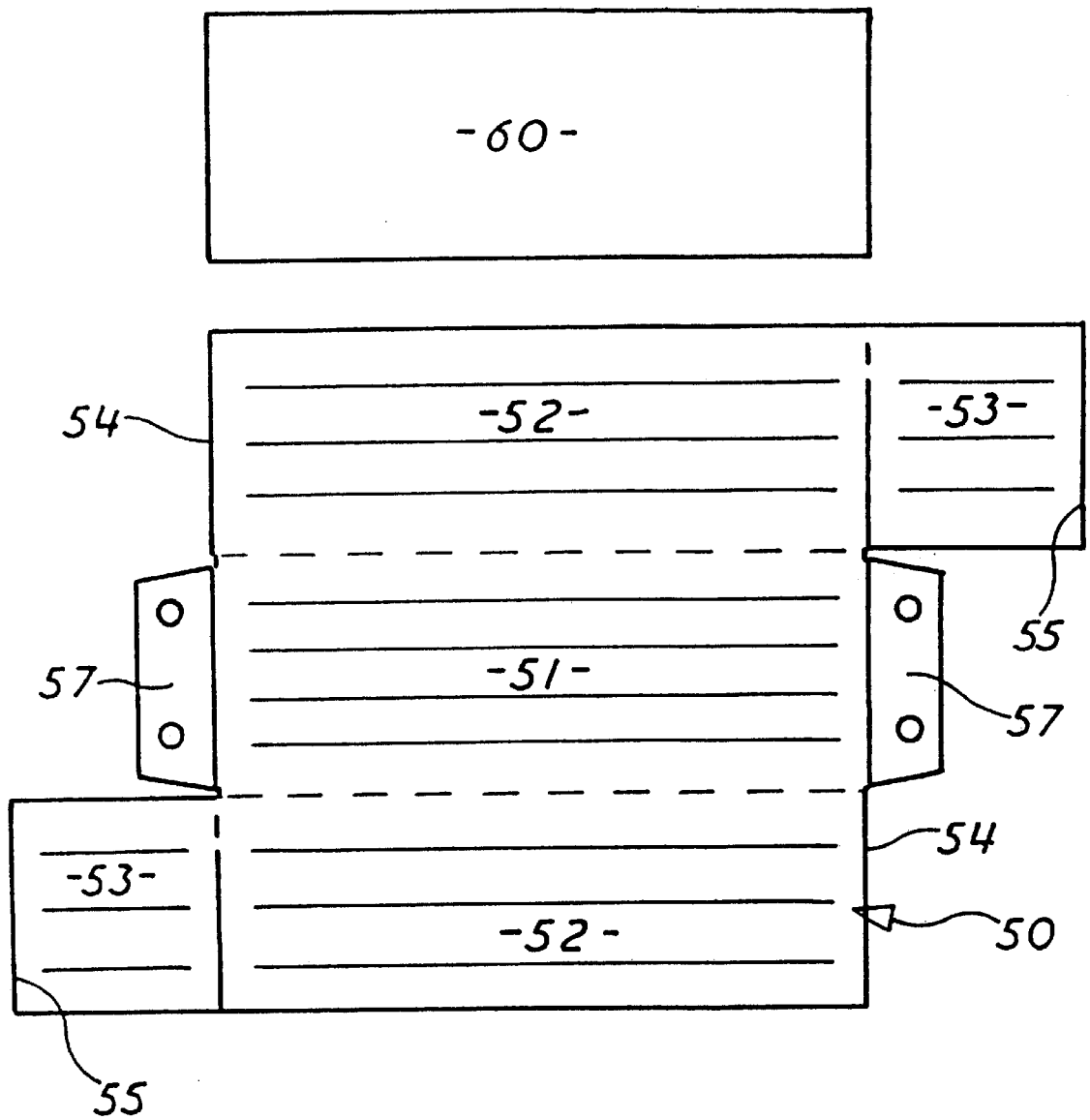
FIG. 6 shows the blank from which the bag of FIG. 5 is formed.

Reference is next made to the bag shown in FIG. 5, which is produced from the sheets of heavy duty p.v.c. shown in FIG. 6. There are two sheets 50 which are welded together in face-to-face relationship to form the base 51 of the bag, the side walls 52 and the end walls 53. The free edges 54 of the side walls 52 are then welded to the contiguous edges 55 of the end walls 53 and the end edges of the base 51 are welded to adjacent edges of the end walls to form the required box-like form of the bag. The welding together of the two sheets 50 is effected along parallel lines, as indicated in FIG. 6, which do not extend to the adjacent edges of the walls of the bag so that the base 51, the side walls 52 and the end walls 53 contain interconnected parallel-sided pockets or inflation compartments which communicate with one another.

Inflation of the bag, i.e. of the base 51, the side walls 52 and the end walls 53, can thus be effected by blowing into a single inflation point 56 either by mouth or by using a simple hand pump. If desired, more than one inflation point may be provided and the air pockets or inflation compartments between the two sheets 50 will be appropriately interconnected to provide for inflation of the base 51 and the walls 52 and 53 of the bag.

The weld lines may be arranged in other patterns, for example, as parts of diamonds, provided that the weld lines are so arranged that, in the completed bag, interconnected inflatable pockets are provided. It is to be appreciated that, by forming the base 51, side walls 52 and end walls 53 from two sheets welded together in the manner described above, there are no joints around the base 51 of the bag which would constitute lines of weakness. The strength of the bag is thus much greater than would be achieved by an arrangement involving the manufacturing of separate inflatable panels which are then welded together at their edges.

The parts of the sheets 50 which form the base 51 of the bag are provided at their ends with flaps or extensions 57 in which eyelets are incorporated so that the ends of carrying straps 58 can be attached to the flaps 57. The eyelets are also of such size that, if required, bank-sticks can be passed through the eyelets when the fisherman wishes to anchor the bag, rather than fix it to his waist.

The bag is provided with a lid or cover 59 formed from a sheet 60 of heavy duty p.v.c. welded to the top edge of one of the side walls 52 of the bag. The lid or cover 59 can readily be folded between its open and closed positions and, when closed, can be fastened in position by means of a zip fastener 61 which extends along the three free sides of the lid or cover 59. The zip fastener 61 may be a waterproof fastener.

The inflatable nature of the bag ensures not only that the bag will float in the water so that the bait and other equipment are always readily to hand without the fisherman having to carry them, but the bag also acts as a buoyancy aid should the fisherman get into difficulties when out in the water.

It is to be appreciated that the bag shown in FIG. 5 can also be used by divers for use in transporting air cylinders, as well as when diving, in which case the zip fastener 61 will be waterproof. The bag shown in FIG. 5 can also be used for the transport of other heavy or breakable objects, such as antiques, and in such instance may be used in combination with an outer net bag of nylon, or other cord, within which the bag of FIG. 5 is placed. For use in the transport of breakable objects, such as antiques, the lid or cover 59 will preferably also be inflatable, being formed of two sheets welded together as described above, so as to provide extra "cushioning" when two such bags are stacked one on top of the other.

Various sizes of bag may be provided and one such size may be for carp fishermen. Such bag may be kept inflated and carried as a ruck-sack so that it is comfortable to carry when filled with all the required tackle. When the bag is unpacked, it can be used as a carp un-hooking mat and the inflated base and walls of the bag will protect the fish. It is also possible to weigh the fish by pulling the straps over the top of the bag and attaching some scales. When it is desired to put the fish back into the water, the fisherman can readily carry the fish in the bag and release it into the water. A larger size of bag can be used by specimen fishermen.

A smaller bag will be used by trout fishermen. The deflated bag will be used as a hold-all or shoulder bag to carry the tackle to the bank. The bag will then be inflated and clipped around the fisherman's waist. With the lid or cover rolled back, the bag will be used to collect the fly line while the fisherman is wading in the water or is on the bank. Once the fish has been caught, the lid is closed, zipped up and the fish taken home in the bag. The bag is made from heavy duty p.v.c. so that it can be hosed out. When deflated and folded up, it is small enough for the fisherman to fit it in his pocket. When inflated, the bag can also be used as a kneeling mat.

The bag is also ideal for use by a specimen hunter while stalking dish, as the bait can be kept to hand with the bag secured around the fisherman's waist. For sea anglers, who have to move up and down the beach with the tide, the bag is merely secured around the waist of the fisherman, keeping the bait and tackle immediately accessible at all times. The bag can also be used for keeping any live-bait cool when used with ice-packs, whether on the beach or in a boat.

The bag can also be used by fisheries for transporting fish. Being made from heavy duty p.v.c., the bag can be filled with water and, once inflated, will protect the fish inside the bag. The bags can be supplied with an outer strong net bag to support the welds and to enable very heavy weights, such as gas cylinders, to be carried.

A further configuration of bag can also be used as a pole bag. It will be about 5 feet long, 8 inches wide and 8 inches high. The bag, when inflated, will provide effective cushioning and protection for the pole when in transit, as well as being usable for washing and soaking the pole.

I claim:

1. A bait bag comprising a container which is substantially rectangular form in plan view, the bag comprising:
   two sheets of synthetic plastic material welded together to form an inflatable blank, said blank defining:
   a) an inflatable rectangular base-defining portion having opposing sides and ends,
   b) two inflatable side-wall-defining portions each having opposing ends and sides, one of said sides of each said side-wall-defining portion being contiguous with a respective one of said sides of said base defining portion, and
   c) two inflatable end-wall-defining portions each having opposing sides and ends, one of said ends of one of said end-wall-defining portions being contiguous with one of said ends of one of said side-wall-defining portions thereby defining a free end of said one end-wall-defining portion and an opposing free end of said one side-wall-defining portion, one of said ends of the other of said end-wall-defining portions being contiguous with one of said ends of the other of said side-wall-defining portions thereby defining a free end of said other end-wall-defining portion and an opposing free end of said other side-wall-defining portion;
   said free end of said one end wall being welded to the free end of said other side-wall-defining portion, said free end of said other end wall being welded to the free end of the said one side-wall-defining portion, said ends of said base-defining portion being welded to respective adjacent free edges of said end-wall-defining portions;

said ends of said base-defining portion each including an extension flap, each said flap including eyelets; and a strap respectively connected to one of the eyelets of each said extension flap whereby the bag is selectively carried by a fisherman and, when inflated, is selectively useable by the fisherman as a buoyancy aid.

2. A bait bag as defined in claim 1, further including a cover welded to one of the side-wall defining portions of the container, the cover being movable between open and closed positions and water-proof zip fastener means being provided for holding the cover in its closed position.

* * * * *